United States Patent [19]

Jordaan et al.

[11] 4,175,943
[45] Nov. 27, 1979

[54] WATER-SOLUBLE FERTILIZERS

[75] Inventors: Pieter J. Jordaan; Jacobus P. van Deventer, both of Strand, South Africa

[73] Assignee: Triomf Fertilizers, Johannesburg, South Africa

[21] Appl. No.: 870,451

[22] Filed: Jan. 18, 1978

Related U.S. Application Data

[63] Continuation of Ser. No. 534,354, Dec. 18, 1974, abandoned.

[30] Foreign Application Priority Data

Dec. 19, 1973 [ZA] South Africa ............... 73/9564

[51] Int. Cl.$^2$ ............................................. C05C 9/00
[52] U.S. Cl. .................................... 71/29; 71/36; 71/41; 71/49; 71/59
[58] Field of Search .............. 71/29, 33, 36, 41, 49, 71/59; 260/553 R, 555 R, 555 B, 555 C

[56] References Cited

U.S. PATENT DOCUMENTS

| | | | |
|---|---|---|---|
| 1,951,518 | 3/1934 | Meiser | 71/29 X |
| 1,966,820 | 7/1934 | Jones | 71/29 |
| 2,036,870 | 4/1936 | Harvey | 71/29 |
| 3,022,153 | 2/1962 | Miller | 71/29 |
| 3,096,168 | 7/1963 | Waters et al. | 71/29 X |
| 3,135,596 | 6/1964 | Sesso | 71/29 X |
| 3,607,213 | 9/1971 | Jerzy et al. | 71/33 |

FOREIGN PATENT DOCUMENTS

339532  6/1972  U.S.S.R. .................................. 71/29

OTHER PUBLICATIONS

Pesek et al., Fertilizer Technology & Use, 2nd edition, 1971, pp. 234–237.
Kirk–Othmer, Encyclopedia of Chemical Technology, 2nd edition, 1966, vol. 9, pp. 135–140.

*Primary Examiner*—Robert H. Spitzer
*Attorney, Agent, or Firm*—Haseltine, Lake & Waters

[57] ABSTRACT

A water soluble mixed fertilizer composition in solid form and a method of producing the fertilizer composition. The fertilizer comprises a mixture of urea, phosphoric acid and at least one potassium salt selected from the class comprising potassium sulphate, potassium nitrate and potassium chloride. Ammonium salts selected from the class comprising ammonium nitrate and ammonium sulphate may optionally also be added to the mixtures. Solid fertilizer compositions possible according to this invention include compositions which contain between 5 and 42% nitrogen, between 2 and 15% phosphorus and between 1 and 38% potassium, these values being elemental mass as a percentage relative to the total mass of the composition.

10 Claims, No Drawings

WATER-SOLUBLE FERTILIZERS

This is a continuation of U.S. patent application Ser. No. 534,354, filed Dec. 18, 1974, now abandoned.

This invention relates to water soluble fertilizers and a method for manufacturing the same.

The growing demand for the use of solid fertilizers for direct application through micro-spray and drip irrigation systems has been accompanied by a search for fertilizers free of the disadvantages normally found in mixed solid fertilizer materials currently on the market. Often fertilizers of this type are not completely soluble in water and undissolved residues tend to block spraying equipment. Certain attempts have been made to overcome these disadvantages including, using individual soluble fertilizer compounds and making "soluble" mixed fertilizers. The preparation of the latter is often an elaborate process and some of the fertilizers are poorly soluble in water.

Furthermore, although it has been known to mix urea and phosphoric acid in stoichiometric proportions to produce a water soluble urea phosphate in solid form, it is however not possible to vary the nitrogen to phosphorus ratios from mixture to mixture and thus vary the fertilizer compositions and at the same time obtain a composition which is wholly solid.

However, it now has been found that the addition of a potassium salt with or without certain other additives has enabled water soluble mixed fertilizer compositions to be made which are wholly solid. Depending on the method in which the constituent parts of the composition are mixed it is possible to vary the nitrogen to phosphorus ratios within the composition and still obtain compositions which are wholly solid.

Accordingly it is an object of the present invention to provide a water soluble mixed fertilizer composition in solid form, and a method of manufacture thereof, which the applicant believes will have certain advantages over the known compositions.

According to the invention a method for manufacturing a water soluble mixed fertilizer composition in solid form includes the steps of adding urea to phosphoric acid, adding at least one potassium salt to the resultant mixture and agitating the mixture.

Further according to the invention the method includes the steps of dissolving urea in phosphoric acid to form a solution of a urea phosphoric acid adduct, adding one or more potassium salts to the solution while agitating the solution, cooling the mixture thus formed to a temperature at which undissolved salts will not settle out and allowing the cooled mixture to solidify. In this form of the invention it is essential that the temperature to which the mixture is cooled must not exceed 43° C. to ensure that the mixture becomes sufficiently viscous to minimise settling out of undissolved solids. On the other hand care must be taken to cool the mixture only until the viscosity thereof is such that settling out of undissolved solids is minimal but the mixture itself is still thin enough to be pourable since it is simpler and more efficient to pack the composition into bags prior to solidification. The temperature at which solidifaction occurs depends on the nitrogen:phosphorus:potassium ratios of the composition and this condition is best observed during the method.

Alternatively according to the invention the method includes the steps of mixing urea and phosphoric acid to form a slurry of urea in phosphoric acid, agitating the slurry, adding one or more potassium salts and optionally adding one or more ammonium salts or a mixture of the potassium and ammonium salts to the slurry while agitating it, and allowing the slurry to cool and set to form a solid. In this form of the invention the mixing of the urea and the phosphoric acid is preferably carried out at a temperature not exceeding 20° C. Preferably the slurry of the urea in phosphoric acid is stirred for a short period, approximately one minute, before adding the salts or the mixture of the salts. Stirring may be continued while adding the salts to agitate the mixture and ensure thorough mixing. In this form of the invention the slurry is preferably packed into bags immediately after the addition of the salts or the mixture of the salts. After the addition of these salts an exothermic reaction takes place and setting of the slurry to form a solid takes place in the bags.

It should be added here that where there is an increase in the NP to K ratio the mixing of the salts should be continued longer to start the exothermic reaction before bagging.

Also according to the invention the method includes the steps of dissolving urea in phosphoric acid to form a solution of a urea phosphoric acid adduct, cooling the adduct to a temperature not exceeding 40° C. while agitating the adduct adding at least one potassium salt to the adduct and agitating the mixture. In this form of the invention the resulting composition may be bagged immediately or stockpiled in bulk and bagged later since it is non-hygroscopic.

According to another form of the invention the method includes the steps of dissolving urea in phosphoric acid to form a solution of a urea phosphoric acid adduct, adding a mixture of potassium salts and ammonium salts and/or urea to the solution while agitating the solution, adding a further quantity of phosphoric acid while the agitation is continued, and allowing the slurry obtained to cool and set to form a solid. In this form of the invention the solution of urea phosphoric acid adduct is agitated during the addition of the potassium salts and the ammonium salts and/or the urea during the addition of the further quantity of phosphoric acid.

It has been found that in this form of the invention where an ammonium salt is added to the mixture the end product is non-hygroscopic and where an ammonium salt is not added the end product is hygroscopic. Accordingly where the composition is non-hygroscopic it may be stockpiled in bulk and bagged later but the hygroscopic material should be bagged immediately to prevent absorbtion of moisture from the atmosphere. With this method the quantity of phosphoric acid used initially may be sufficient to dissolve the urea and the balance of the total amount of phosphoric acid to be used is added after the addition of the salts. In a preferred embodiment of this method however, the quantity of phosphoric acid used to dissolve the urea initially comprises approximately 50% of the total amount to be used, and the further quantity of the phosphoric acid added after the addition of the salts comprises the remaining 50%.

In yet a further embodiment of the invention the method preferably includes the steps of dissolving urea in phosphoric acid to form a solution of a urea phosphoric acid adduct, adding the solution to a mixture of one or more potassium salts and one or more ammonium salts and/or urea while agitating the mixture and cooling it to form a solid particulate product. In this form of the invention the resulting solid particulate product is usually non-hygroscopic and hence immediate packaging into bags is not essential and furthermore once a bag is opened the entire contents do not have to be completely used or the bag re-sealed.

In the form of the invention where the urea is dissolved in phosphoric acid to form a solution of a urea phosphoric acid adduct this step is preferably carried out at a temperature within the range 68° C. to 90° C. The preferred temperature range is from 70° C. to 80° C.

The urea for use in carrying out this method is preferably fertilizer grade or spray grade urea in pill or crystalline form. The phosphoric acid may be strong wet process acid, thermal process acid, or super-phosphoric acid, the acid strength being in the range 20 to 36% m/m P. The preferred range of acid strength is 21 to 25% m/m P.

The potassium salt or salts to be added to the mixture of urea and phosphoric acid may be selected from sulphate, nitrate or chloride and should be reasonably pure so as to avaoid the possible formation of sludge.

The ammonium salt or salts to be added to the mixture of urea and phosphoric acid may be selected from sulphate or nitrate and should preferably also be reasonably pure.

This invention is also directed at the product of the method described and tables of the various formulations of the fertilizer compositions are included with this specification by way of illustration. The various formulations of the fertilizer mixtures are named according to the ratio between N, P and K that they contain, for example 2 - 3 - 4 (36) S contains N,P and K in the ration 2 to 3 to 4 with a total plant nutrient (N+P+K) percentage of 36. The S denotes that the K is present in the sulphate form only.

A number of examples are given as an illustration of the methods according to the invention. These are given by way of example and the invention is not limited to the particular amounts or ratios mentioned.

EXAMPLE 1

Manufacture of 3 - 1 - 5 (41)S

Dissolve 298 kg Urea in 180 kg phosphoric acid (containing 24.5% P m/m) while heating and agitating the mixture. Normally the urea starts to dissolve rapidly once the temperature of the mixture reaches 68° C. and the solution is generally complete by the time the temperature reaches 75° C. The resulting urea phosphoric acid adduct is then cooled to 68° C. and agitated during the cooling step.

Add 522 kg $K_2SO_4$ to the urea phosphoric acid adduct and mix and agitate while cooling further to a maximum of 43° C.

When the temperature of the mixture is 43° C. or below and when the viscosity thereof is such that settling out is minimal but the mixture is still pourable, it is packed into bags. The bags should be sealed immediately they are filled since the material is hygroscopic.

With the method according to this example it is possible to manufacture water soluble fertilizer compositions in solid form which are suitable for plant food with the following NPK ranges:

N 13–42%; P 2–10%; K 2–28%

These values express elemental mass as a percentage relative to the total mass of the composition.

A table of formulations which may be manufactured according to this method of the invention is given below.

| | FORMULAE | | | | |
|---|---|---|---|---|---|
| | 3:1:5(41)S | 3:1:5(45) | 4:1:1(41) | 7:2:1(39)S | 2:2:1(34) |
| Urea | 29,8 | 32,3 | 59,6 | 59,3(LB)* | 27,0 |
| 24/25% $H_3PO_4$ | 18,0 | 19,6 | 27,2 | 31,2 | 55,5 |
| KCl | — | 48,1 | 13,2 | — | 13,2 |
| $K_2SO_4$ | 52,2 | — | — | 9,5 | — |
| $NH_4NO_3$ | — | — | — | — | 3,6 |
| | 4:1:1(39) | | | | |
| Urea | 56,5 | | | | |
| 21,8% $H_3PO_4$ | 29,8 | | | | |
| KCl | 12,8 | | | | |
| $K_2SO_4$ | — | | | | |
| $NH_4NO_3$ | — | | | | |

*LB (Low Biuret) - refers to urea suitable as a foliar spray and containing a maximum of 0,3% Biuret.

EXAMPLE 2

Manufacture of 2 - 3 - 4 (33)S

Cool 465 kg of phosphoric acid, containing 24.5% P m/m, to a temperature not exceeding 20° C. Mix 142 kg urea and the cooled phosphoric acid for a period of approximately one minute at which stage very little urea is dissolved in the acid. Mix 362 kg $K_2SO_4$ and 31 kg $NH_4NO_3$ and add these salts to the urea phosphoric acid mixture. Stir while adding to ensure thorough mixing. Immediately after adding the salts the mixture must be bagged.

EXAMPLE 3

Manufacture of 2 - 3 - 4 (36)S

Dissolve 172 kg urea in 480 kg phosphoric acid, containing 24.5% P m/m, while heating and agitating the mixture. Normally the urea starts to dissolve rapidly once the temperature of the mixture reaches 68° C. and the solution is generally complete by the time the temperature reaches 75° C. The resulting urea phosphoric acid adduct is then cooled to a temperature not exceeding 40° C. and agitated during this cooling step. Then mix 364 kg $K_2SO_4$ with the urea phosphoric acid adduct and agitate to ensure thorough and uniform mixing. The resulting mixture may then be bagged immediately or stockpiled in bulk and bagged later since it is non-hygroscopic.

With the method according to examples 2 and 3, it is possible to manufacture water soluble mixed fertilizer compositions in solid form which are suitable for plant food with the following NPK ratios:

N 4-10%; P 6-15%; K 7-28%;

These values express elemental mass as a percentage relative to the total mass of the composition.

A table of formulations which may be manufactured according to this method of the invention is given below.

|  | FORMULAE | |
|---|---|---|
|  | 2:3:4(33)S | 2:3:4(36)S |
| Urea | 14,2 | 17,2 |
| 24/25% $H_3PO_4$ | 46,5 | 48,0 |
| KCl | — | — |
| $K_2SO_4$ | 36,2 | 36,4 |
| $NH_4NO_3$ | 3,1 | — |

EXAMPLE 4

Manufacture of 3 - 2 - 1 (32)

Dissolve 213 kg urea in 223 kg phosphoric acid (containing 24.5% P m/m) while heating and agitating the mixture. Normally the urea starts to dissolved rapidly once the temperature of the mixture reaches 68° C. and the solution is generally complete by the time the temperature reaches 75° C.%.

Separately mix 104 kg potassium chloride and 189 kg ammonium nitrate and mix these dry ingredients with the urea phosphoric acid adduct and at the same time agitate and cool the mixture. Add the balance of the phosphoric acid viz. 223 kg (preferably in the range of 50% of the total amount used) while continuing to agitate the mixture.

The mixture may be bagged after the addition of the further quantity of phosphoric acid or stock-piled in bulk and bagged at a later stage.

With the method according to this example it is possible to manufacture water soluble mixed fertilizer compositions in solid form which are suitable for plant food with the following NPK ranges:

N 5-30%; P 3-15%; K 1-38%;

These values express elemental mass as a percentage relative to the total mass of the composition.

A table of formulations which may be manufactured according to this method of the invention is given below.

|  | 3:2:1:(32) |
|---|---|
| Urea | 21,3 |
| 24/25% $H_3PO_4$ | 44,6 |
| KCl | 10,4 |
| $K_2SO_4$ | — |
| $NH_4NO_3$ | 18,9 |

|  | 3:2:1(32) |
|---|---|
| Urea | 21,2 |
| 21,8% $H_3PO_4$ | 4,1 |
| KCl | 10,4 |
| $K_2SO_4$ | — |
| $NH_4NO_3$ | 18,4 |

EXAMPLE 5

Manufacture of 3 - 1 - 5 (38)S

Dissolve 83 kg urea in 193 kg phosphoric acid, containing 21.8% P m/m, while heating and agitating the mixture. Normally the urea starts to dissolve rapidly once the temperature reaches 68° C. and the solution is generally complete by the time the temperature reaches 75° C.

Separately mix 496 kg potassium sulphate and 262 kg ammonium nitrate and add the urea phosphoric acid adduct to the solid ingredients and at the same time agitate and cool the mixture. The mixture may be bagged immediately or stock-piled in bulk and bagged at a later date.

It should be noted here that the rate of addition of the urea phosphoric acid adduct and the degree of cooling will determine the particle size of the final mixture. The lower the rate of addition of the urea phosphoric acid adduct and the lower the cooling temperature, the smaller the particles formed.

With the method according to this example it is possible to manufacture water soluble mixed fertilizer compositions in solid form which are suitable for plant food with the following NPK ranges:

N 5-30%; P 3-15%; K 1-38%;

These values express elemental mass as a percentage relative to the total mass of the composition.

A table of formulations which may be manufactured according to this method of the invention is given below.

|  | FORMULAE | | |
|---|---|---|---|
|  | 4:1:1(36) | 2:2:1(34) | 3:1:5(41) |
| Urea | 11,9 | 27,0 | 8,9 |
| 24/25% $H_3PO_4$ | 24,0 | 55,5 | 18,4 |
| KCl | 11,5 | 13,2 | 44,7 |
| $K_2SO_4$ | — | — | — |
| $NH_4NO_3$ | 52,9 | 3,6 | 28,2 |

|  | 3:1:5(38)S | 4:1:1(34) |
|---|---|---|
| Urea | 8,3 | 11,3 |
| 21,8% $H_3PO_4$ | 19,3 | 26,2 |
| KCl | — | 11,1 |
| $K_2SO_4$ | 49,6 | — |
| $NH_4NO_3$ | 26,2 | 51,2 |

Fertilizers of the type described are particularly suitable for use in micro-spray and drip irrigation systems in that they are completely water soluble. Furthermore a 10% solution in water has a pH of between 1.2 and 2.0 and is therefore not very corrosive but may assist in dissolving impurities such as deposits of algal growth, which may have accumulated in the spraying equipment.

In this way the tubes of the spraying equipment and the micro irrigation system are prevented from being choked and therefore the systems run more efficiently.

It is a feature of fertilizers made in accordance with the invention that they include urea phosphates as such in the end product. This is not a feature of other fertilizers of similar character.

It will be appreciated that certain variations in detail exist without materially departing from the scope of the invention as herein described. In this way part of the nitrogen can be added to the mixture by means of adding ammonium nitrate or ammonium sulphate to the mixture, trace elements may or may not be added to the mixture as desired, and diammonium phosphates may be added without significantly altering the pH range of a 10% solution in water.

These and the like variations are envisaged as falling within the ambit of this disclosure.

We claim:

1. A method of manufacturing water soluble mixed NPK fertilizer composition in solid form comprising the steps of (a) dissolving urea in phosphoric acid to form a urea phosphoric acid adduct solution, (b) adding one or more potassium salts to said adduct while agitating to form a mixture in solid or slurry form and (c) cooling the mixture thus formed, so as to crystallize the solid soluble fertilizer granules when the mixture is a slurry, the constituents of the mixture so chosen that the final product contains between 5 and 42% nitrogen, between 2 and 15% phosphorus and between 1 and 38% potassium, these values being elemental mass as a percentage relating to the total mass of the composition, the resulting composition, in 10% aqueous solution, having a pH of between 1.2 and 2.0.

2. A method according to claim 1 wherein one or more ammonium salts or a mixture of potassium and ammonium salts are added to the mixture of step (b) the constituents of the mixture so chosen that the final product contains between 5 and 42% nitrogen, between 2 and 15% phosphorus and between 1 and 38% potassium, these values being elemental mass as a percentage relating to the total mass of the composition, the resulting composition, in 10% aqueous solution, having a pH of between 1.2 and 2.0.

3. A solid water soluble NPK fertilizer composition as prepared according to the process of claim 2.

4. A composition according to claim 3 wherein the ammonium salts are selected from the group consisting of ammonium nitrate and ammonium sulfate.

5. A process according to claim 1 wherein one or more potassium salts and urea are added to step (b) the constituents of the mixture so chosen that the final product contains between 5 and 42% nitrogen, between 2 and 15% phosphorus and between 1 and 38% potassium, these values being elemental mass as a percentage relating to the total mass of the composition, the resulting composition, in 10% aqueous solution, having a pH of between 1.2 and 2.0.

6. A composition as prepared according to the process of claim 5.

7. A process according to claim 1 wherein one or more potassium salts, one or more ammonium salts and urea are added to step (b) the constituents of the mixture so chosen that the final product contains between 5 and 42% nitrogen, between 2 and 15% phosphorus and between 1 and 38% potassium, these values being elemental mass as a percentage relating to the total mass of the composition, the resulting composition, in 10% aqueous solution, having a pH of between 1.2 and 2.0.

8. A composition as prepared according to the process of claim 7.

9. A composition according to claim 8 wherein the ammonium salts are selected from the group consisting of ammonium nitrate and ammonium sulfate.

10. A solid, water soluble NPK fertilizer composition as prepared according to the process of claim 1.

* * * * *